No. 839,352. PATENTED DEC. 25, 1906.
C. A. WHITEHORN.
COMBINED INDICATOR AND REGISTER.
APPLICATION FILED AUG. 11, 1905.
3 SHEETS—SHEET 1.
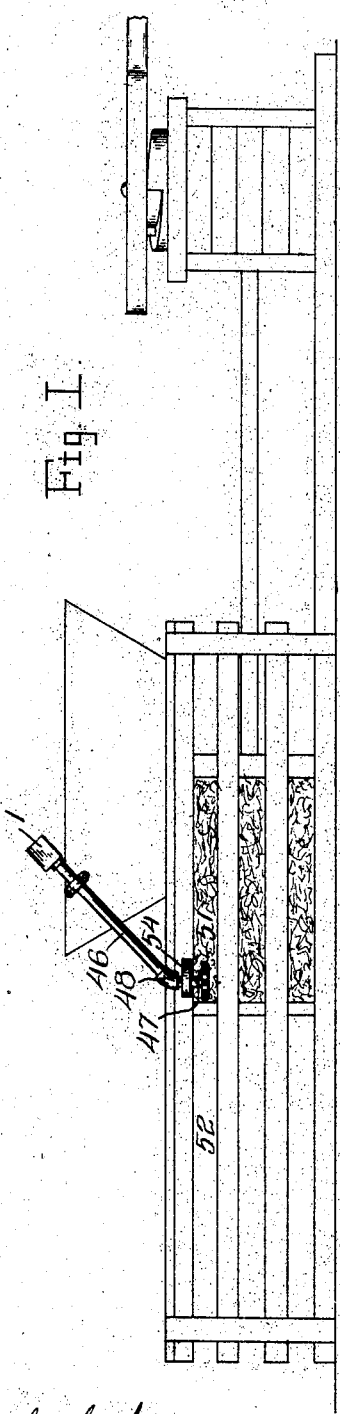
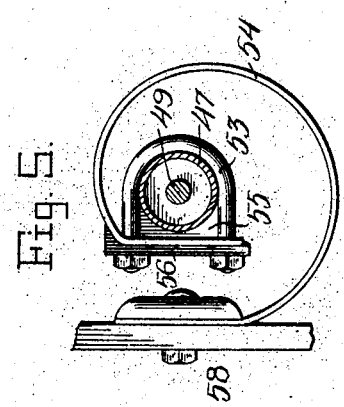

No. 839,352. PATENTED DEC. 25, 1906.
C. A. WHITEHORN.
COMBINED INDICATOR AND REGISTER.
APPLICATION FILED AUG. 11, 1905.
3 SHEETS—SHEET 2.
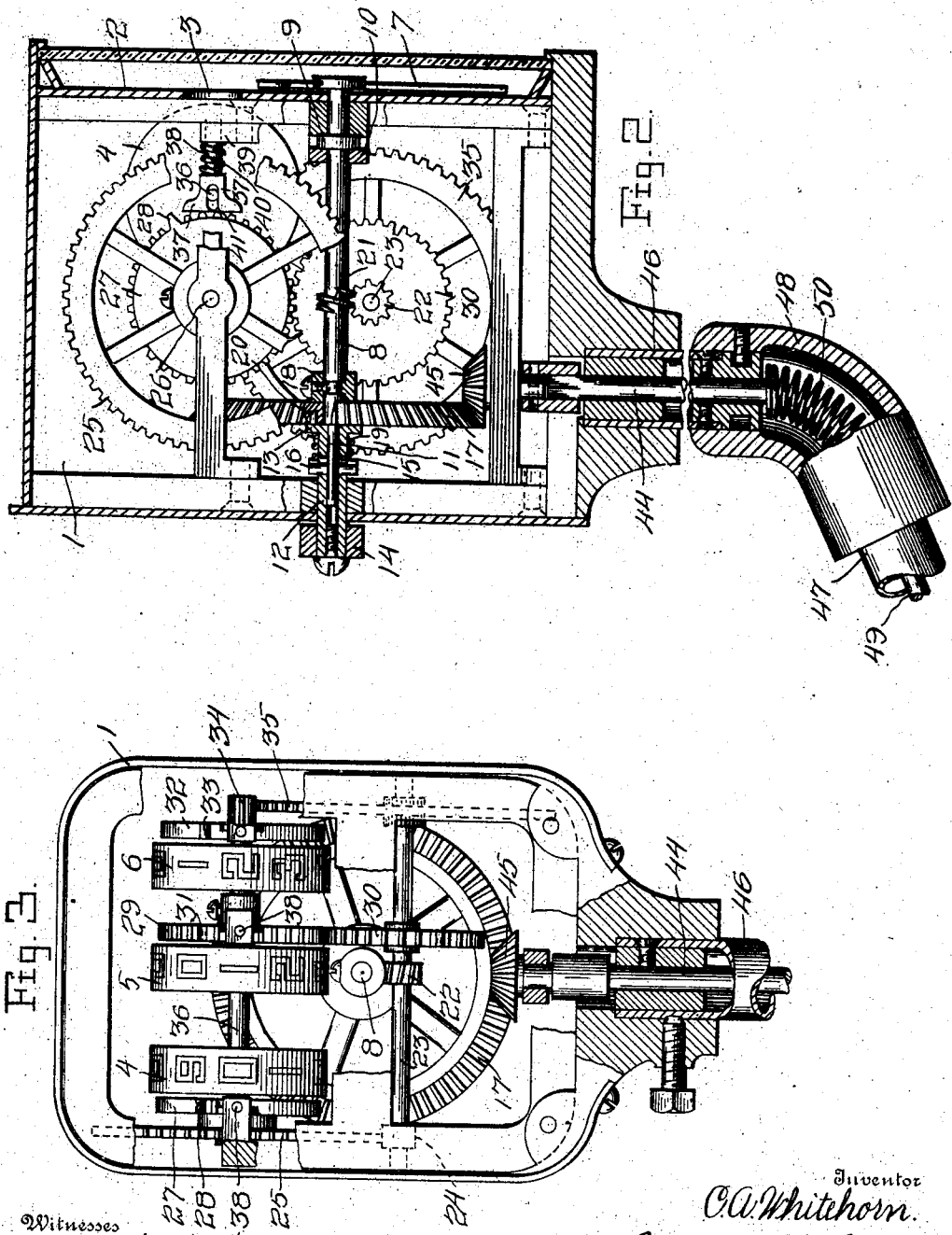
Witnesses
C. K. Kirchenbach
E. M. Dolford
Inventor
O. A. Whitehorn.
By Chandler Chapelle
Attorneys.

No. 839,352. PATENTED DEC. 25, 1906.
C. A. WHITEHORN.
COMBINED INDICATOR AND REGISTER.
APPLICATION FILED AUG. 11, 1905.
3 SHEETS—SHEET 3.
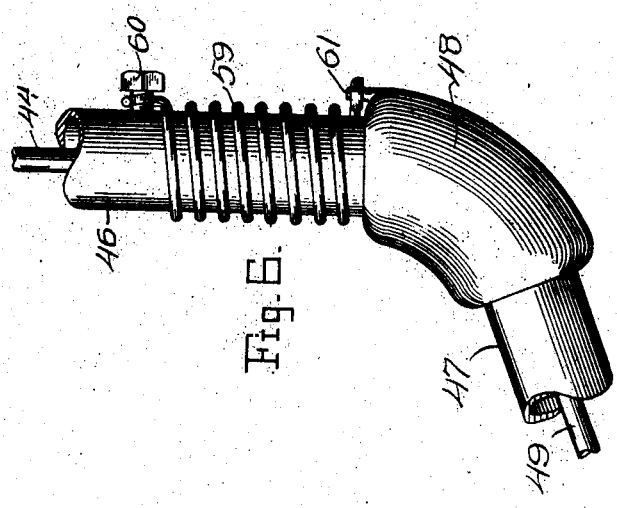
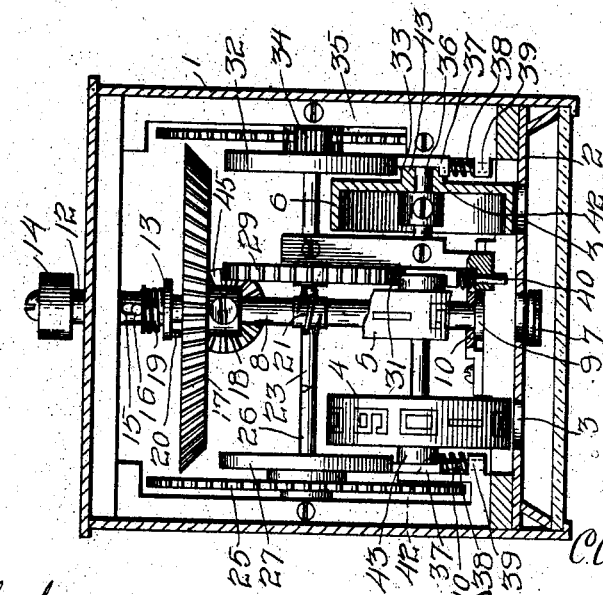
Witnesses
C. K. Reichenbach
E. M. Oxford
Inventor
C. A. Whitehorn
By Chandlee & Chandlee
Attorneys

UNITED STATES PATENT OFFICE.

CHESTER A. WHITEHORN, OF KENNEBEC, IOWA.

COMBINED INDICATOR AND REGISTER.

No. 839,352.

Specification of Letters Patent.

Patented Dec. 25, 1906.

Application filed August 11, 1905. Serial No. 273,771.

*To all whom it may concern:*

Be it known that I, CHESTER A. WHITEHORN, a citizen of the United States, residing at Kennebec, in the county of Monona, State of Iowa, have invented certain new and useful Improvements in a Combined Indicator and Register; and I do hereby declare the following to be a full, clear, and exact description of the invention, such as will enable others skilled in the art to which it appertains to make and use the same.

This invention relates to indicators, and is primarily designed for use in connection with baling-presses to indicate the successive stages of completion of each bale for the guidance of the feed attendant in determining what quantity of hay is necessary for the completion of the bale. It is also proposed to have the indicator register the total number of bales produced and also to provide for conveniently resetting the register whenever desired.

With these and other objects in view the present invention consists in the combination and arrangement of parts as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a view illustrating the present combined indicator and register applied in operative position upon a baling-press. Fig. 2 is an enlarged sectional view of the indicator, taken through the front and back thereof. Fig. 3 is a front elevation of the indicator with the face-plate removed and a portion of the device in section. Fig. 4 is a plan view of the device with parts in section. Fig. 5 is a detail view illustrating one form of means for yieldably holding the drive spur-gear of the present device in engagement with a bale. Fig. 6 is a similar view of another form of means for the same purpose.

Like characters of reference indicate corresponding parts in each of the figures of the drawings.

In explaining the present invention I will first describe the construction of the registering and indicating means and then describe the manner of associating the device with a baling-press for actuation thereby.

The case 1 for housing and protecting the several parts of the registering mechanism is of any approved form, preferably rectangular and provided with a face-plate 2, having a series of sight-openings 3 formed therein to expose the peripheries of a series of indicator wheels or disks, (designated 4, 5, and 6,) the peripheries of said wheels being provided with a series of numerals which are exhibited through the sight-openings as a register of the number of bales completed. The sight-openings 3 are preferably located adjacent one end of the face-plate, so as to give sufficient room for the index or indicator finger 7, which works across the front of the face-plate 2 and is carried by the front end of a shaft 8. It will here be explained that the indicator-finger 7 is capable of making a complete rotation during the production of a single bale, wherefore the relative position of the index or indicator finger clearly indicates the successive stages of the completion of the bale, whereby the feed attendant can readily determine just what quantity of hay is required in the last stage of the completion of the bale.

As best indicated in Figs. 2, 3, and 4, it will be seen that the shaft 8 pierces the front and back of the case 1 and adjacent its forward end is provided with an annular shoulder or collar 9, which rotates within a keeper 10 to prevent endwise play of the shaft. The opposite end of this shaft is reduced, as at 11, and fits loosely within a sleeve 12, which is provided at its inner end with a flange 13 and has its outer end provided with a head 14. There is a longitudinal slot 15 formed through the sleeve, and a diametric pin or key 16 extends through the reduced portion 11 of the shaft and is received within the slot 15. By this construction the sleeve 12 may be moved endwise upon the shaft for a purpose which will be hereinafter fully described. A large beveled gear 17 is mounted to rotate loosely upon the shaft 9 adjacent the inner end of the sleeve and is held against sidewise play by means of the flange 13 of the sleeve and a collar 18, provided upon the shaft. A helical spring 19 embraces the sleeve and bears against the pin 16 and the flange 13, so as to yieldably hold the latter against the hub of the gear, there being a pin or projection 20 upon the flange 13 to fit within a socket in the adjacent end of the hub of the gear, whereby the sleeve 12 constitutes a spring-actuated clutch member to normally interlock the gear with the shaft for simultaneous rotation therewith. It will here be explained that the gear 17 constitutes the drive-shaft for the indicating and registering mechanisms and is controlled by the movement of the bale during the production thereof in a manner as will be hereinafter described.

Upon the middle of the shaft 8 there is a worm 21, which meshes on its under side with a worm-wheel 22, carried by a shaft 23, disposed at substantially right angles to the shaft 8. One end of the shaft 23 carries a pinion 24, which is in mesh with a relatively large gear 25, carried by a shaft 26, disposed above and in substantially vertical alinement with the shaft 23. This gear 25 is provided upon its end face with an enlarged upper portion 27, which has a peripheral tooth 28 on the rim. At the other side of the shaft 8 and upon the shaft 26 there is a gear 29, which is in mesh with a gear 30 of the same diameter upon the shaft 23, the gear 29 being provided with a relatively deep notch 31. Upon the right-hand end of the shaft 26 there is a smooth wheel 32, which is provided with a peripheral tooth 33, the hub of the gear 32 being provided with a pinion 34 in mesh with a gear 35 upon the shaft 23. In front of and parallel with the shaft 26 there is a shaft 36, which carries the indicator-wheels 4, 5, and 6.

Each of the indicator-wheels is normally locked against rotation by an endwise movable latch member 37, having a stem portion 38, working through an opening in a guide-bracket 39, there being a helical spring 40, embracing the stem and bearing against the bracket and the head of the latch, to yieldably hold the latter at its forward limit. As best indicated in Fig. 2, it will be noted that the latch-head 37 is provided with a longitudinal slot 41, through which the shaft 36 extends, whereby the head end of the latch is supported on the shaft and is capable of moving transversely thereacross. The inner or rear end of the head is provided with a lateral tooth or projection 42, which engages with a toothed hub or pinion 43 on the adjacent register-wheel, so as to normally hold the latter against rotation. As best indicated in Fig. 2, it will be noted that the head 37 of the latch is adjacent one of the wheels on the shaft 26, the wheel shown in Fig. 2 being designated 27, whereby when its peripheral projection 28 engages the latch it forces the latter rearwardly and moves its tooth 43 out of engagement with the hub of the indicator-wheel 4, whereby the latter is free to rotate. As the projection 28 sweeps past the head of the latch it also takes into one of the notches or teeth of the pinion 43 on the register-wheel 4 and rotates the same for the space of one notch. Just as soon as the projection 28 clears the latch 37 the latter is snapped back into its original position by the spring 40 and the tooth 42 again engages the pinion 43, and thereby locks the register-wheel 4 against rotation until the projection 28 on the wheel 27 is again brought into play.

When the device is in operation, one rotation of the drive-wheel 17 produces a single rotation of the shaft 8 and also a single rotation of the indicator-finger 7. As will be understood by reference to Fig. 2, the worm-wheel 22 is arranged to make one rotation for every ten rotations of the shaft 8, and the gear 35 and pinion 34 are proportioned so that the pinion 34 and the wheel 32 make ten rotations for each rotation of the gear 35. One rotation of the wheel 32 actuates the latch 37 and moves the indicator-wheel 6 one notch to bring the next successive number into view through the adjacent sight-opening 3 in the front of the case, and when the shaft and gear 35 have made a complete rotation the wheel 32 will have made ten rotations and the indicator-wheel 6 will have made a complete rotation, thereby displaying the numerals from "0" to "9." While the shaft 23 is making a complete rotation the gear 30 will also make a complete rotation, and as the gear 29 is of the same size as the gear 30 said gear 29 will have also made a complete rotation, which brings its projection 31 into play, so as to release the adjacent latch 37 and rotate the adjacent indicator-wheel 5 one notch, thereby to display the numeral 1 simultaneously with the naught of the indicator-wheel 6, thereby disclosing the number "10." It will here be explained that the gear 30 is provided with a notch of a depth sufficient to receive the relatively long projection 31, so as not to interfere with the rotation of the members 29 and 30. One rotation of the shaft 23 produces a single rotation of the pinion 24, which in turn moves the gear 25 only a part of the rotation, the gear 25 and the pinion 24 being so proportioned that it requires ten rotations of the pinion to produce a single rotation of the gear 25. As the wheel 27 is carried by the gear 25, said wheel of course makes one rotation for every ten rotations of the pinion 24, the projection 28 upon the wheel 27 being so arranged as to release the adjacent latch 37 and rotate the adjacent indicator-wheel 4 one notch, so as to bring its numeral "1" into view simultaneously with the naughts of the other register-wheels.

For driving or actuating the register there is a counter-shaft 44 piercing the bottom of the register and provided upon its inner end with a beveled pinion 45 in mesh with the gear 17, these members being so proportioned that it requires ten rotations of the pinion 45 to make a complete rotation of the gear 17. The counter-shaft 44 is contained within a tubular sheath or case 46, which is connected to another tubular case 47 by an elbow 48. In the sheath or case 47 there is a shaft 49, which is connected to the counter-shaft 44 by a helical spring 50 in the elbow 48. The shaft 49 is of a suitable length and is provided upon its outer end with a spur 51, designed to be actuated by the movement of a bale under its successive stages of completion.

In practice the present invention is applied to a baling-press in the manner shown in Fig. 1, wherein has been shown a conventional form of press, (designated in general 52,) the case 1 of the device being located in position to have its indicating or dial face exposed to the view of the attendant, who feeds the hay to the baling-chamber, and the shaft 49 is supported upon the baling-chamber in such a manner as to have the teeth of the spur-wheel 51 in contact with the bale which is being produced. As the partially-completed bale is fed forward by the successive operations of the plungers of the press the spur-wheel 51 will of course be rotated through its direct contact with the bale, and through the medium of the several connections beween the spur-gear 51 and the indicator-finger 7 the latter will be turned in accordance with the completion of the bale, wherefore the feed attendant can readily determine just how far the bale has been completed and how much of a charge is required at the last stage of the completion of the bale. This indicating feature of the invention is a very important one, as it enables the feeder to place in the baling-chamber just enough hay to produce the required size of bale, and therefore there is no loss of wire due to the bursting of too large a bale, nor does it become necessary to add pieces of wire to the bale-band to accommodate the band to an extra large bale. In addition to indicating the successive stages of the completion of each bale the registering mechanism maintains an exact record of the total number of bales produced.

Should it be desired to reset the registering mechanism to zero, all that is necessary is to draw outwardly upon the head or holder 14 of the clutch member 12, so as to draw the pin 20 of the latter out of engagement with the gear 17, thereby to render the latter loose upon the shaft 8, whereupon by rotating the head or handle 14 in a backward direction the shaft 8 will be rotated in a backward direction and all of the parts of the recording mechanism likewise turned backward until all of the registering-wheels 4, 5, and 6 have ben returned to zero.

One embodiment of means for holding the spur-gear against a moving bale has been shown in Fig. 5, wherein the sheath or case 46 is embraced by a substantially U-shaped clip 53, the ends of which also pass through the inner end of a bowed or coiled spring 54, there being a filling-piece 55 interposed between the sheath and the inner end of the spring and a cross bar or plate 56, interposed between said inner end of the spring and the nuts 57 upon the extremities of the clip. The free end of the spring extends upwardly in rear of the clip and is connected by a suitable fastening 58 with the baling-chamber in such a location as to permit of the spur-wheel engaging the bale, as shown in Fig. 1 of the drawings.

Another manner of supporting the spur-wheel in engagement with a bale has been shown in Fig. 6, wherein a helical spring 59 embraces the sheath support 46, with one end fixed thereto by being hooked around a headed projection or pin 60, carried by the sheath, the other end of the spring being engaged with a projection 61 upon the elbow 48, and as said elbow is swiveled upon the sheath 46 there will be a torsional strain upon the sheath-section 47, so as to maintain the spur-wheel in engagement with the bale.

Having thus described the invention, what is claimed is—

1. In a device of the class described, the combination of a case, indicating mechanism carried thereby, a tubular sheath carried by the case and including an elbow, drive-shaft sections rotatable within the sheath, a flexible joint between the shaft-sections and located in the elbow of the sheath, and a clutch on the drive-shaft adapted to render the indicating mechanism operative or inoperative.

2. In a baling-press indicator, the combination, with a flexible sheath-inclosed main shaft, of a drive-wheel loose thereon, indicator means connected with the shaft, and a clutch to interlock the wheel and shaft, said clutch being capable of being disengaged from the wheel and then turned to turn the shaft and reset the indicating means.

3. The combination with a baling-press, of an indicator located adjacent the feed-opening of the baling-chamber, a flexible and sheath-inclosed drive-shaft extending from the indicator to a point adjacent the path of movement of a bale, and a drive-wheel carried by the shaft and located in the path of one side of the bale to rotate the shaft and operate the indicator and a clutch mechanism on the drive-shaft adapted to engage and disengage the said wheel thereto and therefrom.

4. The combination with a baling-press, of an indicator having driving means for actuation by the movement of a bale during the progress of its completion, a spring for supporting the said driving means to yieldably hold the same against a bale and a clutch mechanism for rendering the driving means operative or inoperative.

5. The combination with a baling-press, of an indicator having driving means for actuation by the movement of a bale during the progress of its completion, and a spring to yieldably maintain the driving means in engagement with a bale and a clutch mechanism for rendering the said driving means operative or inoperative.

6. The combination with a fixed member, of an indicator having a drive-shaft including a flexible joint, tubular case-sections housing the shaft, an elbow connecting the case-sections and housing the flexible joint, a drive-wheel carried by the outer end of the shaft, means connected with the fixed member and to the outer case-section to hold the said drive-wheel yieldable in engagement with the moving element and a clutch mechanism on the drive-shaft adapted to render the drive-wheel operative or inoperative.

7. An indicator having a drive-shaft made up of sections with a flexible joint connecting the shaft-sections, tubular case-sections housing the shaft, an elbow carried by one of the case-sections and swiveled to the other section and housing the flexible joint, a drive-wheel carried by the outer end of the shaft, and means connected to the case for holding the wheel in engagement with a moving member and a clutch mechanism on the drive-shaft adapted to render the drive-wheel operative or inoperative.

8. In an indicator, the combination with a main shaft, of a drive-wheel loose thereon, indicator means connected with the shaft, and a clutch to interlock the wheel and shaft, said clutch capable of being disengaged from the wheel and then turned to turn the shaft and reset the indicating means.

9. In an indicator, the combination with a case, of a drive-shaft, indicator means connected thereto, a drive-wheel loose upon the shaft, and clutch mechanism including an endwise-movable tube receiving one end of the shaft and piercing the case into accessible position, the tube and the wheel having a projection and socket-interlocking connection, the tube being provided with a longitudinal slot, and a projection carried by the shaft and working in the slot, the tube capable of being moved outwardly to disengage the wheel and then turned to rotate the shaft and reset the indicating mechanism.

10. In an indicator, the combination with a case having its front provided with exposure-openings, a main shaft piercing the front of the case, an index-finger carried by the front end of the shaft and working over the front of the case, indicator-wheels geared to the shaft with their numbered peripheries exposed through the respective openings, a drive-wheel loose upon the shaft, and a clutch to interlock the wheel and the shaft, said clutch having a portion piercing the back of the case into accessible position and capable of being rotated to rotate the shaft when disengaged from the wheel to reset the indicator-wheels.

11. The combination, with a baling-press, of an indicator, a main shaft, a drive-wheel loose thereon for actuation by movement of the bale, a spring for supporting the drive-wheel to maintain it yieldingly in engagement with the bale, a clutch on the main shaft to interlock the wheel and shaft, said clutch being capable of being disengaged from the wheel and then turned to turn the shaft and reset the indicating means.

12. In an indicator, the combination with a flexible main shaft, of a drive-wheel on the shaft adapted to be connected to turn therewith and to turn thereon, and a spring for supporting the drive-wheel.

In testimony whereof I affix my signature in presence of two witnesses.

CHESTER A. WHITEHORN.

Witnesses
J. A. MEAD,
M. A. MARLEY.